April 23, 1935.   J. DE VELLIER   1,998,493
CUTTING DEVICE
Filed Jan. 29, 1934
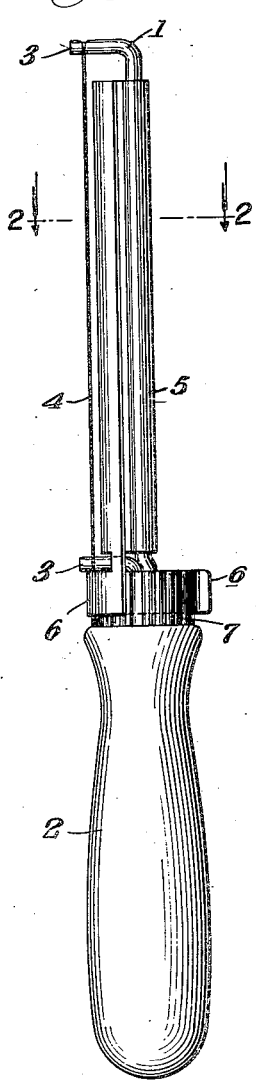
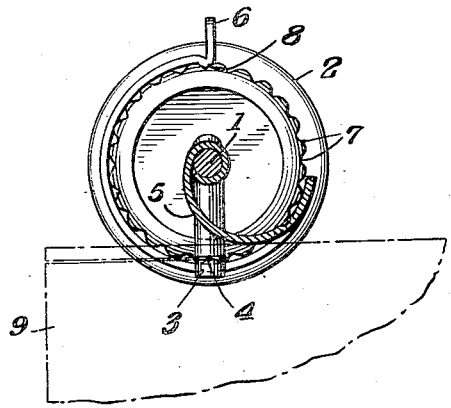
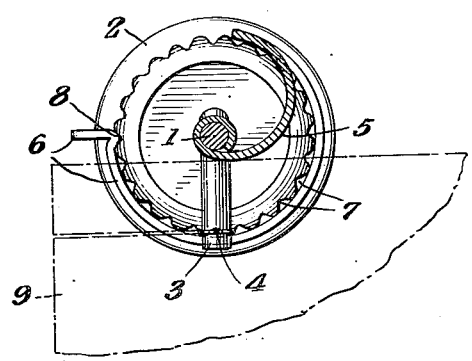
INVENTOR
Jacques De Vellier
BY
ATTORNEY Patented Apr. 23, 1935

1,998,493

UNITED STATES PATENT OFFICE 1,998,493

CUTTING DEVICE

Jacques De Vellier, Westchester County, N. Y.

Application January 29, 1934, Serial No. 708,743

4 Claims. (Cl. 31—27)

My present invention relates to a cutting device and has special application to a device of the class described for cutting cheese, butter and the like.

One of the essential features of the device of my present invention is the fact that the cheese, butter and the like can be cut into slices of predetermined thicknesses.

The device of my present invention, in addition to the foregoing advantages, is cheap and simple in construction and gives ease of operation without the complexities heretofore found necessary in the art to achieve the result attained by this invention. Other advantages of this invention will be obvious to those skilled in the art to which the present invention relates, and will be further pointed out hereinafter.

In the drawing

Fig. 1 is a plan view.

Fig. 2 is a transverse section along the line 2—2 of Fig. 1 showing the device in one of its adjusted positions.

Fig. 3 is a view similar to that of Fig. 2, showing the device in another of its adjusted positions.

Referring now more particularly to the drawing the device of the present invention consists of a frame 1 which may be affixed to a handle 2, the frame having projecting portions 3. Between these projecting portions 3, of the frame, is strung a cutting wire 4.

Rotatably and eccentrically mountable on the main portion of the frame 1, is an arcuate guide member 5, so that when said guide member rotates about said frame, the distance between said guide member and the cutting wire 4 varies as shown in Figs. 2 and 3.

Affixed to the guide member is a sleeve 6, which is rotatable about the lower portion of the handle 2 at 7. This portion 7 may, if desired, be slightly corrugated, and the sleeve 6 may have an abutment 8, so that greater friction and control may be obtained if necessary.

When it is desired to cut a piece of cheese, butter or the like, shown at 9, the guide member is rotated until the distance between it and the cutting member is equivalent to the thickness of cheese desired. The cutting member is then placed on the cheese and moved along, cutting the cheese, until the desired piece has been cut off.

The foregoing completes the description of one embodiment of my invention, shown by way of illustration only. Various modifications may be made therein without departing from the spirit of my invention or the scope of the claims.

What I claim as my invention is:

1. A cutting device comprising an elongated frame having projecting portions, a cutting member affixed to the projecting portions of said frame, and a guide member eccentrically operable about said frame to vary the depth of the cut.

2. A cutting device comprising an elongated frame having projecting portions, a cutting member affixed to the projecting portions of said frame, a guide member eccentrically operable about said frame to vary the depth of the cut, and means to limit the rotation of said guide member.

3. A cutting device comprising an elongated frame having projecting portions, a cutting member affixed to the projecting portions of said frame, and an arcuate guide member eccentrically operable about said frame to vary the depth of the cut.

4. A cutting device comprising an elongated frame having projecting portions, a cutting member affixed to the projecting portions of said frame, an arcuate guide member eccentrically operable about said frame to vary the depth of the cut, and means to limit the rotation of said arcuate guide member.

JACQUES DE VELLIER.